No. 610,829. Patented Sept. 13, 1898.
J. L. RANEY.
PIPE TRIMMER AND CUTTER.
(Application filed Jan. 20, 1898.)
(No Model.) 2 Sheets—Sheet 1.
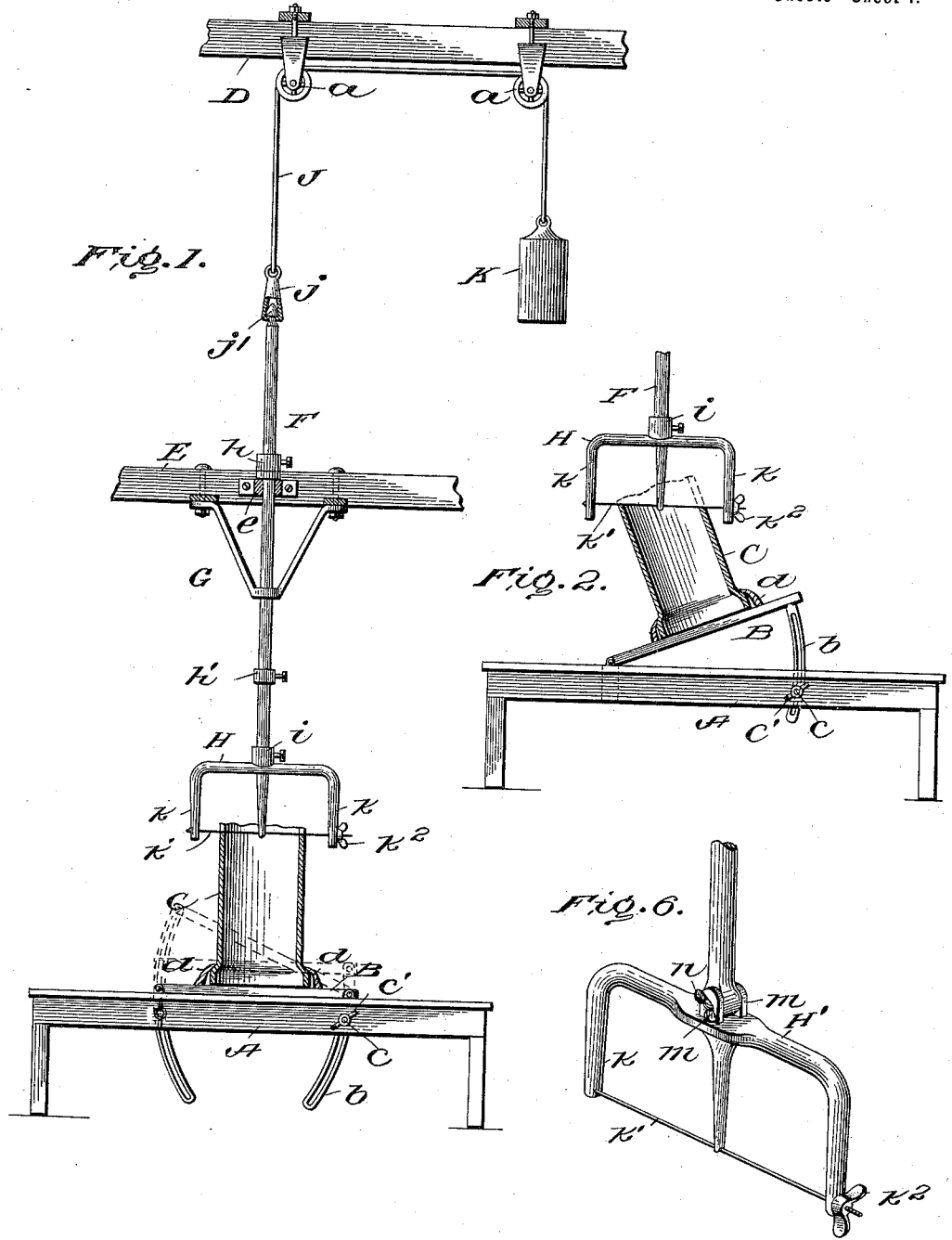
Witnesses:
Inventor:
James L. Raney,
by R. H. C. Lacey,
his Attorney

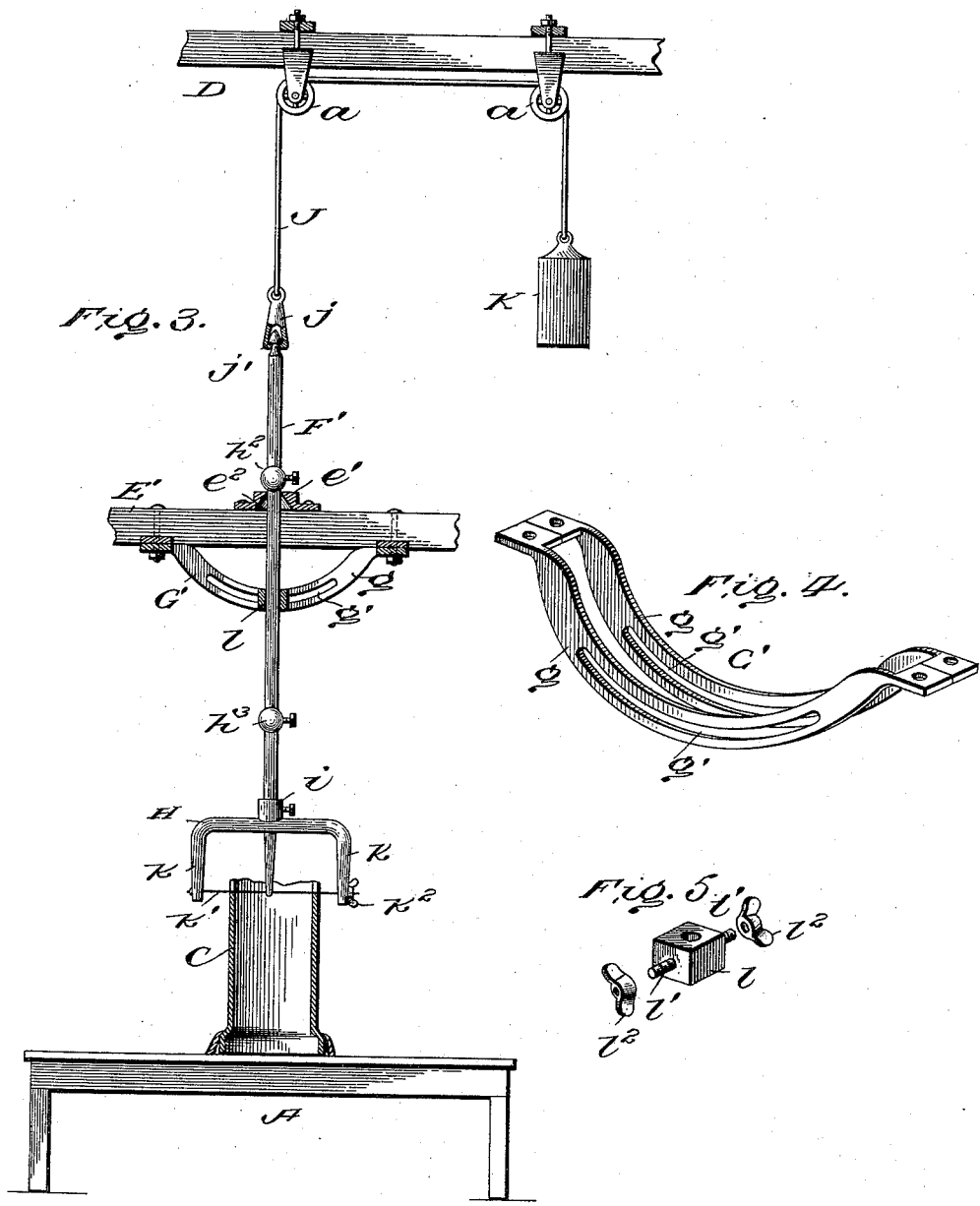

UNITED STATES PATENT OFFICE.

JAMES L. RANEY, OF TORONTO, OHIO.

PIPE TRIMMER AND CUTTER.

SPECIFICATION forming part of Letters Patent No. 610,829, dated September 13, 1898.

Application filed January 20, 1898. Serial No. 667,250. (No model.)

*To all whom it may concern:*

Be it known that I, JAMES L. RANEY, a citizen of the United States, residing at Toronto, in the county of Jefferson and State of Ohio, have invented certain new and useful Improvements in Pipe Trimmers and Cutters; and I do hereby declare the following to be a full, clear, and exact description of the invention, such as will enable others skilled in the art to which it appertains to make and use the same.

My invention relates to improvements in pipe cutters and trimmers, and has for its object the production of a simple, durable, and efficient device by means of which the end of a clay pipe may be readily and quickly trimmed or cut off at any desired angle to fit into elbows or other couplings.

With this and other objects in view the invention consists in certain novel features of construction, combination and arrangement of parts, as will be hereinafter more fully described, and specifically set forth in the appended claims.

In the accompanying drawings, forming a part of this specification, Figure 1 is a side elevational view, with parts shown in section, of a pipe cutter and trimmer embodying my invention. Fig. 2 is a side view illustrating the manner of cutting off the end of a pipe at an angle. Fig. 3 is a view similar to Fig. 1, but illustrates a modification in the means for adjusting the parts to cut the pipe at an angle. Fig. 4 is a perspective view of the bearing-bracket shown in Fig. 3; Fig. 5, a perspective view of the adjustable bearing-block or cross-head; Fig. 6, a perspective view illustrating a modification in the construction of the cutter-frame.

Referring now to Figs. 1 and 2 of the said drawings, A represents a table to which is pivoted one end of an adjustable platform B, designed to receive a pipe C to be operated upon, and this platform is provided at its free end with a pendent slotted segment-arm $b$, extending through a slot in the top of the table and fitted to slide on a headed guide pin or screw $c$, provided with a wing-nut $c'$, whereby said arm may be rigidly clamped in adjusted position. The rim edge of the pipe is rested on this platform and is retained in position by clamps $d$, and by adjusting the platform the pipe may be supported at an angle, as shown in Fig. 2.

D E represent upper and lower girders, and F a vertical shaft mounted to slide longitudinally and rotate in a bearing-block $e$, fixed on the side of the lower girder, and a bearing-bracket G, hanging pendent from said girder, and $h\ h'$ represent upper and lower collars provided with set-screws and adapted to be adjusted on the shaft and to abut against the bearings to hold the shaft against longitudinal movement when the parts are adjusted to act on the pipe. The shaft carries at its lower end a cutter frame or bow H, detachably secured thereto by a collar and set-screw $i$, said frame having depending arms $k$, notched to receive a cutting-wire $k'$, adapted to be brought into contact with the upper end of the pipe C to trim or cut off the same at an angle. Any suitable means for tightening or slacking the wire may be provided—as, for instance, a tightening-screw $k^2$, engaging a threaded end thereof and bearing against one of the end arms $k$. The upper end of the shaft is connected to one end of a rope, chain, or wire J by means of a swivel consisting of a conical sleeve or socket $j$, which receives a head $j'$ on the end of the shaft, whereby the shaft may freely rotate, and this rope, chain, or wire is passed over pulleys $a$ on the girder D and carries at its free end a counterweight K. The function of this weight is to balance or nearly balance the weight of the shaft and attachments, and thereby relieve the operator of its support while trimming or cutting a pipe and enable him to raise the same without exertion.

Briefly the operation of my device thus far described is as follows: Supposing the apparatus to be in the position indicated in Fig. 1, the operator by grasping the cutter-frame H is enabled to rotate the shaft and cutter and cause the wire $k'$ to abrade the upper surface or edge of the pipe for the purpose of trimming the same. If, however, it is desired to sever the pipe squarely, the shaft is adjusted to its proper position and prevented from moving longitudinally by setting the stop-collars $h\ h'$. The cutter-frame is now operated as before, causing the wire to press against the side of the pipe to cut into the clay and sever the desired length. When it is desired to cut off the end of the pipe at an angle, this may be effected by adjusting the platform B as shown in Fig. 2.

In the embodiment of my invention disclosed in Figs. 3, 4, and 5 the platform B is dispensed with and the shaft F' is arranged to swing in the arc of a circle to adjust the cutter-frame to sever pipes at an angle. The bearing-block $e'$ here is placed upon the top of the girder E' and is formed with a conical socket $e^2$, and the stop-collars $h^2$ $h^3$ are made round or spherical to enable the shaft to swing freely laterally. The bearing-bracket G' consists of two parallel segmental plates $g$, formed with alined slots $g'$, in which slide the lateral arms $l'$ of a bearing-block or crosshead $l$, in which the shaft has bearing, said arms being threaded for the reception of wing-nuts $l^2$, whereby said bearing-block may be clamped to hold the shaft in adjusted position. The mode of operation with this construction will be readily understood.

The cutter-frame illustrated in Fig. 6 is intended to be employed in connection with the construction shown in Fig. 1, with the exception of the adjustable platform B, which by its use is dispensed with. This frame H' is similar in construction to that shown in Fig. 1, except that it is provided with ears $m$ for passage of a pivot pin or bolt, which swivels it to the lower end of the shaft, and a wing-nut $n$, fitted on said bolt to hold the frame fixed with relation to the shaft. By this construction the saw-frame itself may be adjusted to cut off the ends of pipes at an angle. The shaft and cutter may be rotated by hand or power.

From the above description, taken in connection with the accompanying drawings, it will be seen that my invention provides a simple, durable, and effective device for the purpose stated which embodies desirable and important advantages over the crude and cumbersome drums ordinarily employed. By its use the work is greatly simplified and expedited.

I desire it understood that I do not limit my invention to the specific construction and relation of parts herein shown and described, but reserve the right to make such changes and modifications as fairly fall within the spirit and scope of my invention.

Having thus fully described my invention, what I claim as new and useful, and desire to secure by Letters Patent, is—

1. In a pipe cutter and trimmer, the combination, with the three following instrumentalities, to wit: a pipe-support, a shaft mounted in bearings to rotate and to have vertical adjusting movement, and a cutting and trimming device carried by said shaft; of means for adjusting one of the above-named instrumentalities to cause the said cutting and trimming device to extend at an angle to the upper end of a pipe mounted on said support, adjustable stop devices on the shaft above and below the bearings to limit the movement of the shaft in both directions, and a counterbalancing-weight connected with the upper end of said shaft, substantially as described.

2. In a pipe trimmer and cutter, the combination with a girder carrying upper and lower bearings, of a shaft mounted in said bearings to rotate and have longitudinal adjusting movement, stop-collars on the shaft above and below said girder adapted to contact with the bearings, a cutting and trimming device on the lower end of the shaft, and a counterbalancing-weight connected with the upper end of said shaft, substantially as described.

3. In a pipe trimmer and cutter, a supporting-girder carrying upper and lower bearings, a shaft mounted to rotate and to have longitudinal adjusting movement in said bearings, stop-collars on the shaft above and below said girder, and a wire trimmer and cutter on the lower end of said shaft, in combination with a table provided with an adjustable pipe-support, substantially as described.

4. In a pipe cutter and trimmer, the combination of an upper girder D carrying pulleys $a$, a lower girder carrying bearings $e$, G, a shaft mounted to revolve in and slide freely through said bearings, adjustable stop-collars on the shaft above and below said lower girder, a wire trimmer and cutter on the lower end of the shaft, and a counterbalancing device consisting of a cord or its equivalent passed over said pulleys on the upper girder and carrying at one end a counterweight and having at the other end a swivel connection with the upper end of the shaft, substantially as described.

In testimony whereof I affix my signature in presence of two witnesses.

JAMES L. RANEY.

Witnesses:
SHERMAN BLACKBURN,
M. H. RUMBARGER.